(12) United States Patent
Ja

(10) Patent No.: US 11,550,162 B2
(45) Date of Patent: Jan. 10, 2023

(54) METHODS AND SYSTEMS FOR EFFICIENT SEPARATION OF POLARIZED UV LIGHT

(71) Applicant: Phoseon Technology, Inc., Hillsboro, OR (US)

(72) Inventor: Shiou-jyh Ja, Portland, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 556 days.

(21) Appl. No.: 16/404,679

(22) Filed: May 6, 2019

(65) Prior Publication Data

US 2019/0339540 A1   Nov. 7, 2019

Related U.S. Application Data

(60) Provisional application No. 62/668,096, filed on May 7, 2018.

(51) Int. Cl.
| | |
|---|---|
| *G02B 27/28* | (2006.01) |
| *G02F 1/1335* | (2006.01) |
| *G02F 1/13357* | (2006.01) |
| *G01J 3/10* | (2006.01) |

(52) U.S. Cl.
CPC .............. *G02B 27/283* (2013.01); *G01J 3/10* (2013.01); *G02B 27/288* (2013.01); *G02F 1/13362* (2013.01)

(58) Field of Classification Search
CPC .. G02B 27/283; G02B 27/288; G02B 27/285; G02B 27/286; G02B 13/10; G02B 17/04; G02B 27/0972; G02B 13/0065; G02B 13/007; G01J 3/10; G01J 3/14; G01J 3/42; G02F 1/13362

USPC .......... 359/483.01, 489.01, 489.08, 489.09, 359/489.1, 489.11, 489.12, 489.13, 359/485.01–485.06, 486.01–486.03, 359/487.01, 487.05, 629, 638–640; 356/5.14, 33, 321–322, 326–327, 356/450–454, 484–487, 491, 364
See application file for complete search history.

(56) References Cited

U.S. PATENT DOCUMENTS

| | | | |
|---|---|---|---|
| 4,161,349 A | 7/1979 | Norman | |
| 5,233,620 A | 8/1993 | Shinozaki et al. | |
| 6,288,832 B1* | 9/2001 | Richman | .......... G02F 1/37 359/328 |
| 7,031,566 B2 | 4/2006 | Kochergin et al. | |
| 8,817,831 B1* | 8/2014 | Terraciano | .......... G02F 1/3501 372/22 |
| 2002/0126715 A1 | 9/2002 | Gerstenberger et al. | |

(Continued)

OTHER PUBLICATIONS

ISA Korean Intellectual Property Office, International Search Report and Written Opinion Issued in Application No. PCT/US2019/030961, dated Aug. 23, 2019, WIPO, 11 pages.

*Primary Examiner* — Marin Pichler
(74) *Attorney, Agent, or Firm* — McCoy Russell LLP

(57) ABSTRACT

Methods and systems are provided for separating polarized UV light. In one example, a method may include passing polarized source light through a first prism, the polarized source light including desired light and undesired light, separating the desired light from the fundamental light, and passing the separated desired light through a second prism. The separated desired light which is passed through the second prism may then be further passed through a spatial filter.

4 Claims, 6 Drawing Sheets

(56) References Cited

U.S. PATENT DOCUMENTS

2011/0032598 A1 2/2011 Horikawa et al.
2011/0149281 A1\* 6/2011 Ellis .................... G01J 11/00
356/330

\* cited by examiner

METHODS AND SYSTEMS FOR EFFICIENT SEPARATION OF POLARIZED UV LIGHT

CROSS REFERENCE TO RELATED APPLICATIONS

The present application claims priority to U.S. Provisional Application No. 62/668,096, entitled "METHODS AND SYSTEMS FOR EFFICIENT SEPARATION OF POLARIZED UV LIGHT," filed on May 7, 2018, the entire contents of which are hereby incorporated by reference for all purposes.

FIELD

The present description relates generally to methods and systems for separating polarized UV light.

BACKGROUND AND SUMMARY

Separation of light may desirable for a wide range of applications. For example, separation of light at particular wavelengths may be desirable for spectroscopy and chromatography, among other applications where a light source at a particular wavelength may be desirable, such as curing and research applications, for example. In applications related to spectroscopy and chromatography, pure extraction of light at a desired wavelength may be important for obtaining accurate measurements.

In the application of generating UV light emission from a visible light source using the second harmonic generation (SHG) principle, desired SHG light is approximately collinear with undesired fundamental light, where the fundamental light is residual light at a fundamental wavelength of the visible original pump light source. An intensity of the fundamental light may be several orders of magnitude higher than that of the desired SHG light due to a low SHG conversion efficiency at low irradiance levels, including UV irradiance levels. Such low SHG conversion efficiency at the low irradiance levels makes it difficult to effectively separate the desired SHG light from the undesired fundamental light.

For example, the high intensity of the fundamental light relative to the SHG light may result in diffraction of the fundamental light within a light separating device such as a spatial filter and lead to incomplete separation of the desired SHG light from the fundamental light. It is noted that the desired SHG light may be UV light in one or more examples.

Spectral filters for separation of UV light have traditionally relied upon the use of specialized materials with a high UV transmission and high refractive index contrast to separate UV light. However, the inventors have recognized several issues with such traditional spectral filters for performing UV light separation.

For example, there are few materials that have both a high enough UV transmission and a high enough refractive index contrast to perform UV light separation, and the materials meeting both the high UV transmission and high refractive index requirements for UV light separation are costly. Such costly materials and requirement of sophisticated filter design lead to increased manufacturing costs for spectral filters, especially with regards to traditional high-performance spectral filters for light separation in a deep UV wavelength range (e.g., lower than 300 nm), where a thin film-based filter is often utilized. In some cases, traditional custom filters may cost tens of thousand dollars to design and fabricate.

Moreover, traditional spectral filters filtering light at deep UV wavelength often yield poor results due to a low transmission efficiency of the desired SHG light in a pass band or a low attenuation of the undesired light in the rejection band. For example, some filters may have lower than 20% transmission of the desired UV light and can only reject 99% of undesired fundamental light (e.g., equivalent to having Optical Density of 2, OD2).

Thus, recognizing these above issues, the inventors have developed an approach to separating UV light that achieves high performance polarized UV light extraction via prism refraction and spatial filtering. Via the approach developed by the inventors, highly effective UV light extraction may be achieved with cost savings compared to traditional spectral light filtration.

In one example, the issues described above may be addressed by a method for passing polarized source light through a first prism, the polarized source light including second-harmonic generation (SHG) light and fundamental light, separating the SHG light from the fundamental light, and passing the separated SHG light through a second prism. The SHG light passed through the second prism may then be further passed through a spatial filter in one or more examples to further reduce scattered stray light.

In this way, substantial spatial and spectral separation between desired light (the SHG light) and undesired light (the fundamental light) may be achieved for efficient desired light extraction, while avoiding the use of costly materials. The throughput of SHG light as high as 99.7% and the attenuation of the fundamental light higher than OD8 has been observed.

As one example, optics included in a light separation system may provide polarized source light, the source light comprising desired SHG light and undesired fundamental light. It is noted that the source light may be visible light in one or more examples. The polarized source light may then be directed through the first prism, and the first prism may refract the source light causing some separation of the desired light, such as SHG light, and the undesired light, such as fundamental light. However, the amount of spatial separation created via the first prism may not be sufficient for extraction of the desired light without pollution from the undesired light due to diffraction from the spatial filtering. Thus, the desired light is further passed through a second prism following refraction at the first prism to create further spatial separation from the undesired light. Via the methods and systems developed by the inventors, desired SHG light may be separated from undesired fundamental light in order to enable efficient extraction of the desired SHG light. Moreover, the approach developed by the inventors may be at greatly reduced cost compared to traditional approaches which may have required specialized materials or inefficient gratings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for separation of polarized UV light. In at least one example light separation system, two or more prisms may be positioned relative to a polarized source light such that the source light may be separated into desired light and undesired light.

Figure 1:
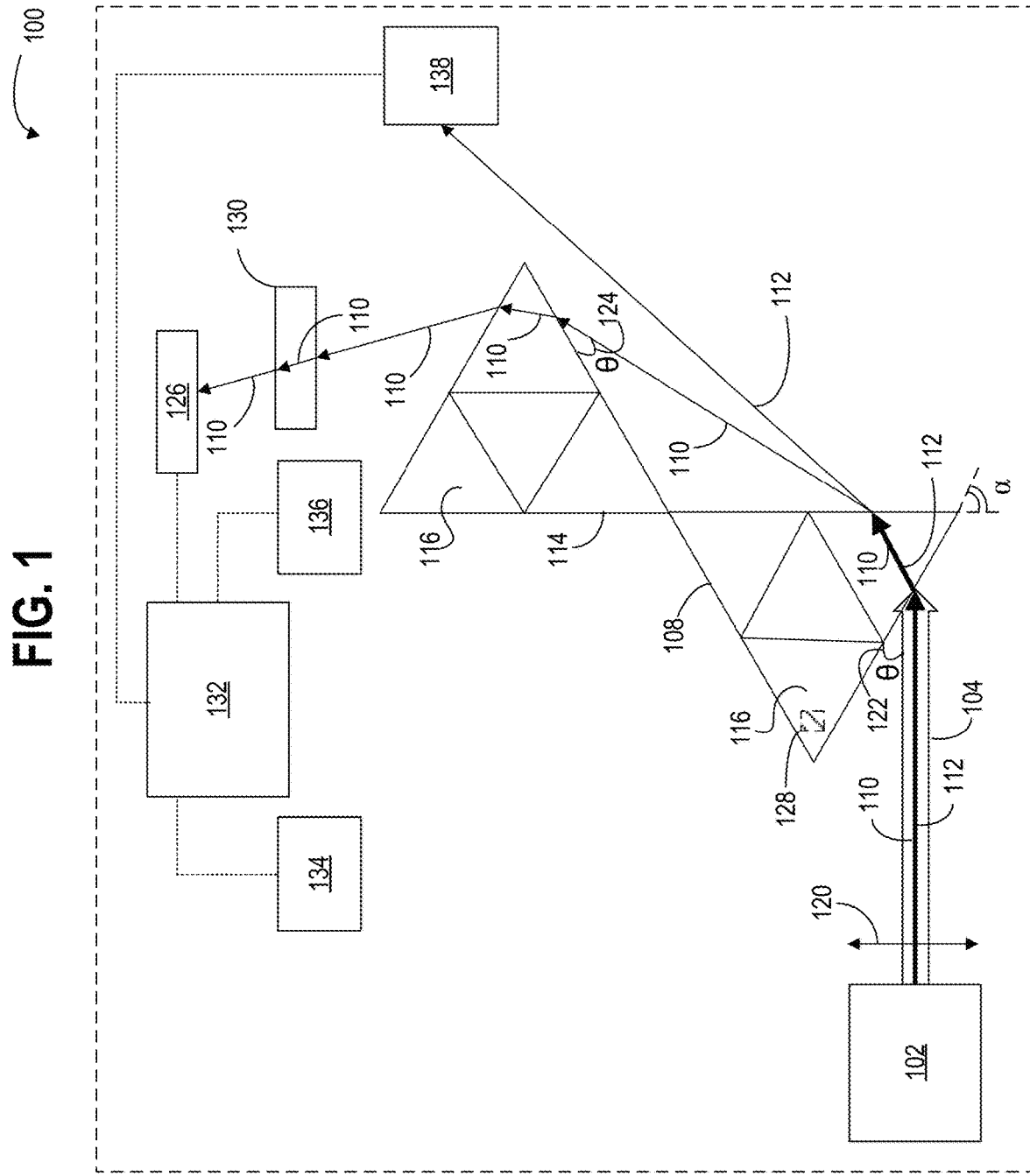
FIG. 1 shows a schematic diagram of a first example light separation system, according to at least one example of the present disclosure.
Figure 3:
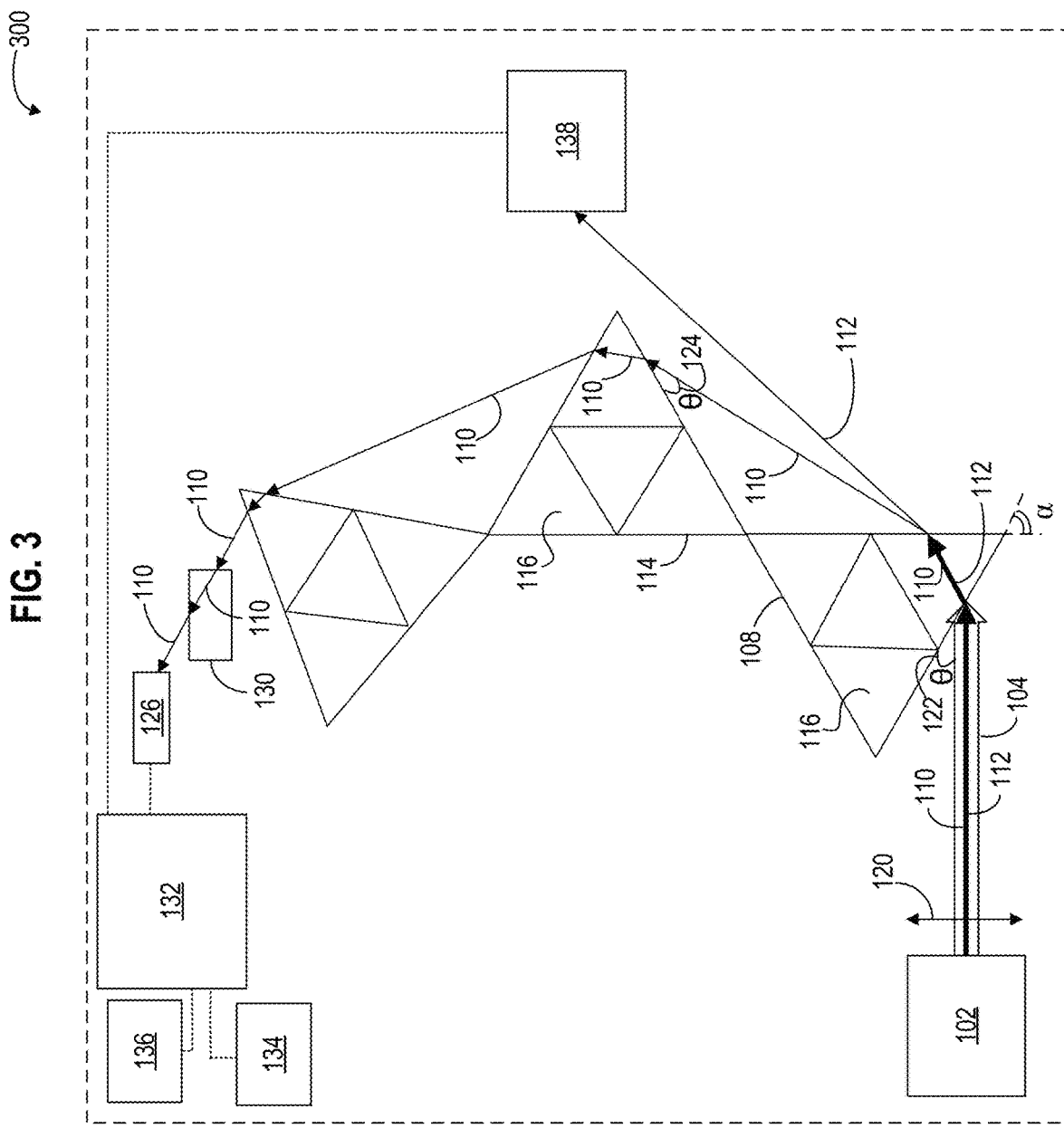
FIG. 3 shows a schematic diagram of a third example light separation system, according to at least one example of the present disclosure.

For example, such an example light separation system may include two prisms, such as shown at FIG. 1. Alternatively, an example light separation system may include more than two prisms, such as shown at FIG. 3, where the light separation system shown at FIG. 3 includes three prisms. Additional prism stages may be used if even higher degree of separation is desired.

Figure 2:
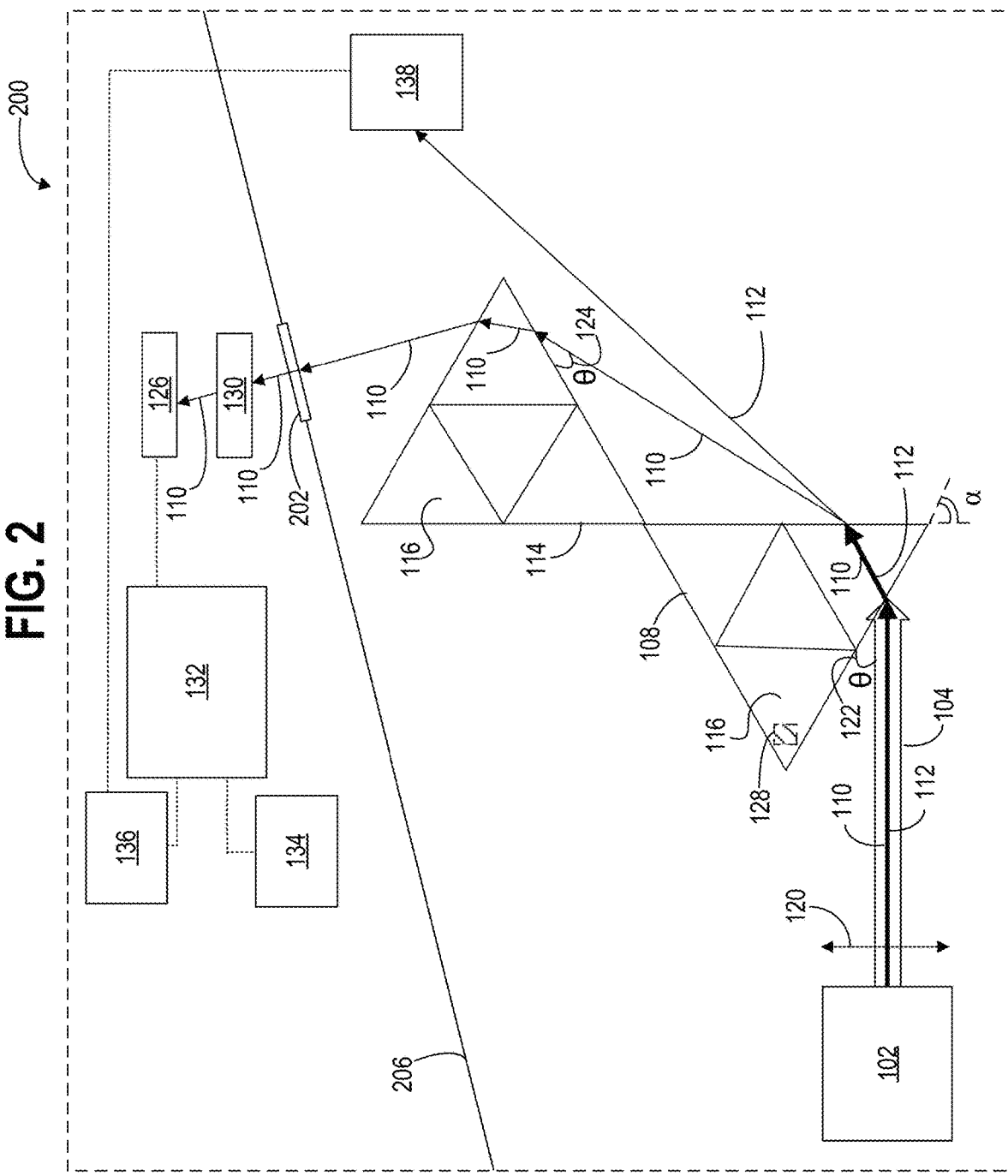
FIG. 2 shows a schematic diagram of a second example light separation system, according to at least one example of the present disclosure.

In one or more examples, the light separation system of the present disclosure may include a spatial filter positioned downstream of the prisms in a path of the desired light for further filtration purposes. The spatial filter may be a pinhole, as shown at FIG. 2, for example. Thus, as shown in the method at FIG. 5, polarized source light may be separated via filtration through two or more prisms, and, in at least one example, a spatial filter. Such an approach may beneficially achieve high performance separation of light without having to utilize costly materials found in traditional spectral filters, for example. In one or more examples, the light separation system of the present disclosure may be contained within a case in order to block environmental light for accurate readings, such as shown at FIG. 6.

For purposes of discussion, FIGS. 1-6 will be described collectively. Thus, elements described introduced in a first figure may not be reintroduced in subsequent figures and may be labeled similarly.

Turning to FIG. 1, FIG. 1 shows a first example light separation system 100. As shown in FIG. 1, the first example light separation system 100 includes optics 102, where optics 102 generate source light 104.

The optics 102 may be positioned upstream of a first prism 108, and a second prism 114, where upstream and downstream is in reference to a movement of second-harmonic generation (SHG) light through the light separation system 100.

Optics 102 may generate source light 104, where the source light 104 may be visible light in at least one example. For example, optics 102 may generate a laser source light 104. The source light 104 is polarized and comprises SHG light 110 as well as fundamental light 112. In one or more examples, a type-I phase matching scheme may be used in the optics 102. In examples where type-I phase matching may be used in optics 102, the SHG light 110 and the fundamental light 112 of source light 104 may have perpendicular polarization 120. The first prism 108 and the second prism 114 may be oriented so that the SHG light 110 is polarized parallel to the plane of incident and often termed as p-polarized, as shown in FIG. 1. The Fresnel equation indicates that the SHG light 110 may have transmission as high as 99.7% through the first prism 108 and the second prism 114, which is higher than traditional spectral filters.

In at least one example, the source light 104 may be a visible light source (e.g., 430 nm wavelength), such as a laser, and the source light 104 may comprise SHG light 110 and fundamental light 112, where the desired SHG light 110 is approximately collinear with the undesired fundamental light 112 of the source light 104. The intensity of the fundamental light 112 may be several orders of magnitude higher than that of the desired SGH light 110 due to low conversion efficiency at low irradiance levels.

Source light 104 generated by optics 102 may be directed through first prism 108, and SHG light may be further directed through second prism 114. First prism 108 and second prism 114 may be made of optically transparent material. For example, first prism 108 and second prism 114 may be isosceles prisms, and first prism 108 and second prism 114 may be made of fused silica in one or more embodiments. For example, the first prism 108 and the second prism 114 may be two isosceles prisms made of fused silica with one angle α=69 degrees.

Both first prism 108 and second prism 114 may comprise a plurality of facets 116, where the facets 116 of each of the prisms are used to introduce a propagation angular difference between desired light 110 and undesired light 112. In at least one example, the facets 116 may be coated with a coating 128 that favors specific spectral or polarization content. Such a coating 128 may beneficially be applied to the facets 116 in order to adjust separation performance of the prisms, for example. However, the light separating systems disclosed herein are highly efficient even without coating 128. Thus, the facets 116 may be uncoated for purposes of reduced cost in at least one example, while still achieving highly efficient light separation.

The first prism 108 is positioned in a light path of the source light 104 generated by optics 102, so that optics 102 directs source light 104 through first prism 108.

The SHG light 110 and the fundamental light 112 of source light 104 are approximately collinearly incident upon entry at a facet 116 of first prism 108. In one or more examples, the source light 104 may be collinearly incident on a facet 116 of the first prism with an angle θ of approximately 30 degrees, shown at incident angle 122 in FIG. 1. As discussed in further detail below, the transmission of the SHG light 110 through a single prism may be at an angle θ=30 degrees. For example, incident angle 122 in FIG. 1 may be an angle θ=30 degrees, where the SHG has a polarization axis perpendicular to the base of the prism results in efficient SHG light transmission.

The source light 104, including SHG light 110 and fundamental light 112, passed through the first prism 108 is refracted by first prism 108 and separates SHG light 110 and fundamental light 112 of the source light 104. Thus, the SHG light 110 and fundamental light 112 are approximately collinear upon entry into first prism 108, and SHG light 110 and fundamental light 112 exit first prism 108 at two different exit angles.

For example, the SHG light 110 and the fundamental light 112 may be substantially collinear upon entry through first prism 108, and the exit angles of the SHG light 110 and fundamental light 112 exiting first prism 108 may differ. In one or more examples, the difference between the exit angle of the SHG light 110 and the fundamental light 112 may be between 1 degree and 10 degrees. It is noted that as SHG light 110 is desired in at least one example, SHG light may also be referred to as desired light herein. Similarly, as fundamental light 112 is undesirable in at least one example, fundamental light 112 may also be referred to as undesired light herein. In one or more examples where the source light 104 may be a visible light source, the SHG light 110 may not be visible light. For example, in cases where the light source 104 may be a laser (e.g., 440 nm wavelength), the SHG light 110 may be UVC light emission (e.g., 220 nm wavelength) separated from the visible light source.

Due to the small angular difference between the SHG light 110 and fundamental light 112 upon exiting the first prism 108, substantial propagation space following refraction of the source light 104 via the first prism 108 may be required for successful separation to occur, as light exiting first prism 108 has an extended Gaussian beam profile with a significantly larger intensity of fundamental light 112 compared to the SHG light 110. That is, the difference of the exit angles between the SHG light 110 and the fundamental light 112 achieved by a single prism is not sufficient for performing high efficiency light separation without substantial propagation space, as the extended Gaussian beam profile of the fundamental light 112 may result in residual fundamental light 112 extending into the light beam of desired SHG light 110. Moreover, the inclusion of a spatial filter (e.g., a pinhole) immediately following the first prism 108 may also fail to achieve separation between desired SHG light 110 and fundamental light 112, as a structure defining the spatial filter opening may diffract fundamental light into the spatial filter opening.

However, the second prism 114 is positioned in a path of SHG light 110, and out of a path of fundamental light 112. Thus, after exiting the first prism 108, the SHG light 110 passes through second prism 114 and the fundamental light 112 does not pass through the second prism 114 in the geometric optical sense. That is, a significant portion of the beam of the fundamental light 112 does not pass through the second prism 114 after being passed through the first prism 108, and a beam of the desired light 110 (e.g., SHG light) is passed through the first prism 108 and then passed through the second prism 114. In at least one example, the significant portion of the beam of fundamental light 112 that does not pass through the second prism 114 may be more than half of the beam of fundamental light 112. In another example, the significant portion of the beam of fundamental light 112 that does not pass through the second prism 114 may be more than 75% of the beam of fundamental light 112. Such passing of the desired SHG light 110 through second prism 114 may beneficially combat a diffraction effect due to the Gaussian geometry of the fundamental light beam by steering fundamental light 112 far away from the second prism 114, and thus also steer fundamental light 112 away from SHG light 110. The fundamental light 112 may be directed to a fundamental light receiver 138, in one or more example. For example, fundamental light receiver 138 may be a light dump to absorb the fundamental light 112 and prevent pollution of the desired SHG light 112. Additionally or alternatively, the fundamental light receiver 138 may comprise one or more sensors for referencing purposes. For example, the fundamental light receiver 138 may comprise one or more sensors for reference against light received at detector 126 for measurement purposes.

Though not shown, the system may further include additional prisms downstream of the first prism 108 through which only the fundamental light 112 is passed through in order to increase a spatial separation between the desired SHG light 110 and the fundamental light 112. The SHG light 110 passed through second prism 114 is refracted via the second prism 114, further physically separating desired light 110 from undesired light 112. Put another way, via the second prism refraction of the desired light signal 110, the angle between desired light 110 and undesired light 112 is increased. It is noted that in one or more examples, the desired light 110 may be UV light, such as UVC light. However, other desire light wavelengths may be possible.

Thus, though only a small degree of separation of the desired light and the undesired light may be achieved by passing light through the first prism 108 which results in a system which is unable to sufficiently separate desired light from undesired light without substantial propagation space, via the use of at least two prisms, substantial physical separation of the desired light 110 from the undesired light 112 may be achieved within a small space. Therefore, by refracting the SHG light 110 through both the first prism 108 and the second prism 114, the technical effect of efficient extraction of desired light may be achieved in a compact manner.

Following refraction of the SHG light 110 through second prism 114, the SHG light may then be directed to a detector 126.

For example, in cases where the light separation system 100 may be a part of a spectroscopy device or chromatography device, such as a high-performance liquid chromatography (HPLC) device, the SHG light 110 may be directed through the first prism 108 as a part of source light 104, then the SHG light 110 may be directed through the second prism 116, a sample 130, and received at detector 126, where detector 126 may provide a reading to a control unit 132. In examples where the light separation system 100 is not part of a measurement device such as a spectroscopy device, however, the SHG light 110 directed through the second prism 116 may be directed to a destination other than a sample 130 and detector 126. In particular, the SHG light 110 passed through the second prism 116 may then be directed towards any desired final destination without being passed through a sample and detector.

In at least one example, control unit 132 may be communicatively linked with a display unit 134. Thus, responsive to receiving the reading from detector 126, control unit 132 may provide an output to display unit 134, such as a wireless or a hardwired output, and the display unit may display the reading via display unit 134. In some examples, the display unit 134 may be connected to the control unit 132 via a wired connection. However, in one or more examples, the display unit 134 may be connected to the control unit 132 via a wireless connection. In addition to detector 126 sending outputs to control unit 132, it is noted that light separation system 100 may further comprise a user input receiving unit 136 which is also connected to the control unit 132. For example, the user input receiving unit 136 may comprise one or more of a touch screen, microphone, piezoelectric receiving device, mouse, keyboard, etc. In one or more examples, all of the components of the first example light separating device 100 may be contained within a case. Alternatively, the optics 102, first prism 108, and second prism 114 may be contained within a case, and one or more of the sample 130, detector 126, control unit 132, display unit 134, and user input receiving unit 136 may be contained within the case.

In cases where the first example light separation device 100 may be a spectrophotometer or chromatograph, for example, a reading may be taken responsive to receiving a user input at user input receiving unit 136 requesting a reading. For example, user input receiving unit 136 may provide an output to control unit 132 responsive to receiving a user input, and control unit 132 may comprise instructions stored in non-transitory memory executable by a processor of control unit 132, responsive to receiving the request for a reading via an output from user input receiving unit 136, operate optics 102 and direct polarized source light 104 from optics 102 to first prism 108, where desired light 110 (e.g., SHG light) is separated from undesired light 112 (e.g., fundamental light) via refraction at first prism 108.

The desired light 112 separated from the fundamental light 110 via the first prism 108 may then be passed through second prism 114, creating further spatial separation between desired light 112 and fundamental light 110. The desired light 112 may then be further passed through a sample 130 and received at detector 126. For example, sample 130 may be a liquid or a gas sample. The sample may be contained in a cuvette in one or more examples. The detector 126 may provide an output to control unit 132 responsive to receiving the desired light 112 at detector 126.

Further, whereas the desired light 110 is directed towards second prism 114, sample 130, and detector 126 following refraction at first prism 108, the undesired fundamental light 112 may be directed towards fundamental light receiver 138 and received at the fundamental light receiver 138, away from desired light 110 following refraction at first prism 108. In cases where the fundamental light receiver 138 may comprise one or more sensors, fundamental light receiver 138 may provide an output to control unit 132 responsive to receiving the fundamental light 112.

Further, though not shown, it is noted that in some cases one or more of a reference sample and additional prisms may be positioned in a path of the fundamental light 112 between the first prism 108 and the fundamental light receiver 138. The inclusion of one or more additional prisms in the path of the fundamental light 112 between the first prism 108 and the fundamental light receiver 138 may be advantageously oriented to create further spatial separation between the desired light 110 and the fundamental light 112 for improved purity of desired light extraction.

The control unit 132 may comprise instructions stored in non-transitory memory executable by a processor of the control unit 132 to display light measurements responsive to receiving the output from the detector 126 and the output from the fundamental light receiver 138. For example, the light measurements may be displayed via a display unit such as display unit 134. In some examples, displaying the light measurements may include displaying the raw signal data from both the fundamental light receiver 138 and the detector 126. Additionally or alternatively, displaying the light measurements may include displaying light measurements taking into account the output from the fundamental light receiver 138 as a reference for comparison against the output from the detector 126.

Alternatively, however, fundamental light receiver 138 may not be included in the first example light separation system 100, or the fundamental light receiver 138 may absorb undesired fundamental light 112 without providing an output to control unit 132.

In such examples where there is no fundamental light receiver 138 or where fundamental light 112 is absorbed at the fundamental light receiver 138 without an output being provided to the control unit 132 via fundamental light receiver 138, a display may be provided based on upon the output received from detector 126 responsive to a request for a reading.

Turning now to FIG. 2, FIG. 2 shows a schematic diagram of a second example light separation system 200. In addition to the optics 102, first prism 108, and second prism 114 included in first example light separation system 100, light separation system 200 may further comprise a spatial filter 202 and a detector. In at least one example, spatial filter 202 may be a pinhole formed into a case 206. Case 206 may surround the optics 102, first prism 108, and second prism 114, in one or more examples. Moreover, while control unit 132, display unit 134, and user input receiving unit 136 are shown outside of the second light separation system 200, any one or more of the control unit 132, display unit 134, and user input receiving unit 136 may be positioned within case 206.

However, in at least one example the second example light separation system 200 may not include a detector.

As discussed above in relation to FIG. 1, small physical separation between SHG light 110 and fundamental light 112 prevents a spatial filter from effectively separating SHG light 112 from fundamental light 112. For example, if source light 104 is only passed through a single prism and a spatial filter is positioned immediately downstream of the single prism, the Gaussian beam profile of the fundamental light 112 may cause the fundamental light 112 to interfere with SHG light 110 at the spatial filter. In particular, the fundamental light 112 may refract off of the structure defining an opening of the spatial filter, causing the fundamental light 112 to interfere with the SHG light 110.

However, by directing source light 104 through the first prism 108 to separate the SHG light 110 and the fundamental light 112, and then passing only the beam of SHG light 110 through second prism 114, the SHG light 110 may be further refracted by the second prism 114 and a physical separation between the beam of SHG light 110 and the beam of the fundamental light 112 may be increased. The increase in spatial separation between the SHG light 110 and the fundamental light 112 may enable a spatial filter 202 proximal and downstream of the second prism 114 to function.

That is, due to the increased spatial separation of the SHG light 110 and the fundamental light 112 downstream of the second prism 114, the technical effect of reducing an amount of undesired fundamental light 112 that is able to interfere at the spatial filter 202 is greatly reduced. Via the inclusion of a spatial filter 202 in addition to the at least two prisms, a significant signal rejection ratio as much as 1 E8 may be achieved to reduce undesired fundamental light 112. Thus, efficient separation of desired SHG light 110 may be achieved in a compact manner.

Further, in one or more examples light separation system 200 may further include a detector 204 downstream of spatial filter 202. For example, in cases where light separation system 200 may be a spectroscopy device or a chromatography device, SHG light 110 may be passed through a sample 206 positioned between spatial filter 202 and detector 204 for measurement purposes. However, in one or more examples, light separation system 200 may not include a sample 206 and/or detector 126 and associated components including control unit 132, display unit 134, and user input receiving unit 136. Thus, light downstream of spatial filter 202 may be directed toward a final destination without being passed to sample 130 and/or detector 126.

Turning now to FIG. 3, FIG. 3 shows a schematic diagram of a third example light separation system 300. Third example light separation system 300 is substantially similar to first example light separation system 100 with the addition of a third prism 302 positioned downstream of the second prism 114. The addition of the third prism 302 may further spatially separate the SHG light 110 from the fundamental light 112. Thus, even further efficient extraction of the desired SHG light 110 may be achieved. While third example light separation system 300 does not show a spatial filter downstream of the third prism 302, the third example light separation system 300 may further include a spatial filter downstream of the third prism 302, and upstream of detector 126 and sample 130, similarly as in second example light separation system 200.

Moreover, the addition of further prisms and spatial filters may be possible for an even higher degree of spectral and separation and to direct the desired light beam into preferred direction. However, it is noted that the addition of further prisms or spatial filters may have diminishing returns as to increased efficiency for extraction of desired light.

It is noted that sample 130 and/or detector 126 and associated components including control unit 132, display unit 134, and user input receiving unit 136 may be omitted from the third example light separation device, in at least one example. Thus, light downstream of third prism 302 may be directed toward a final destination without being passed to sample 130 and/or detector 126.

Figure 4:
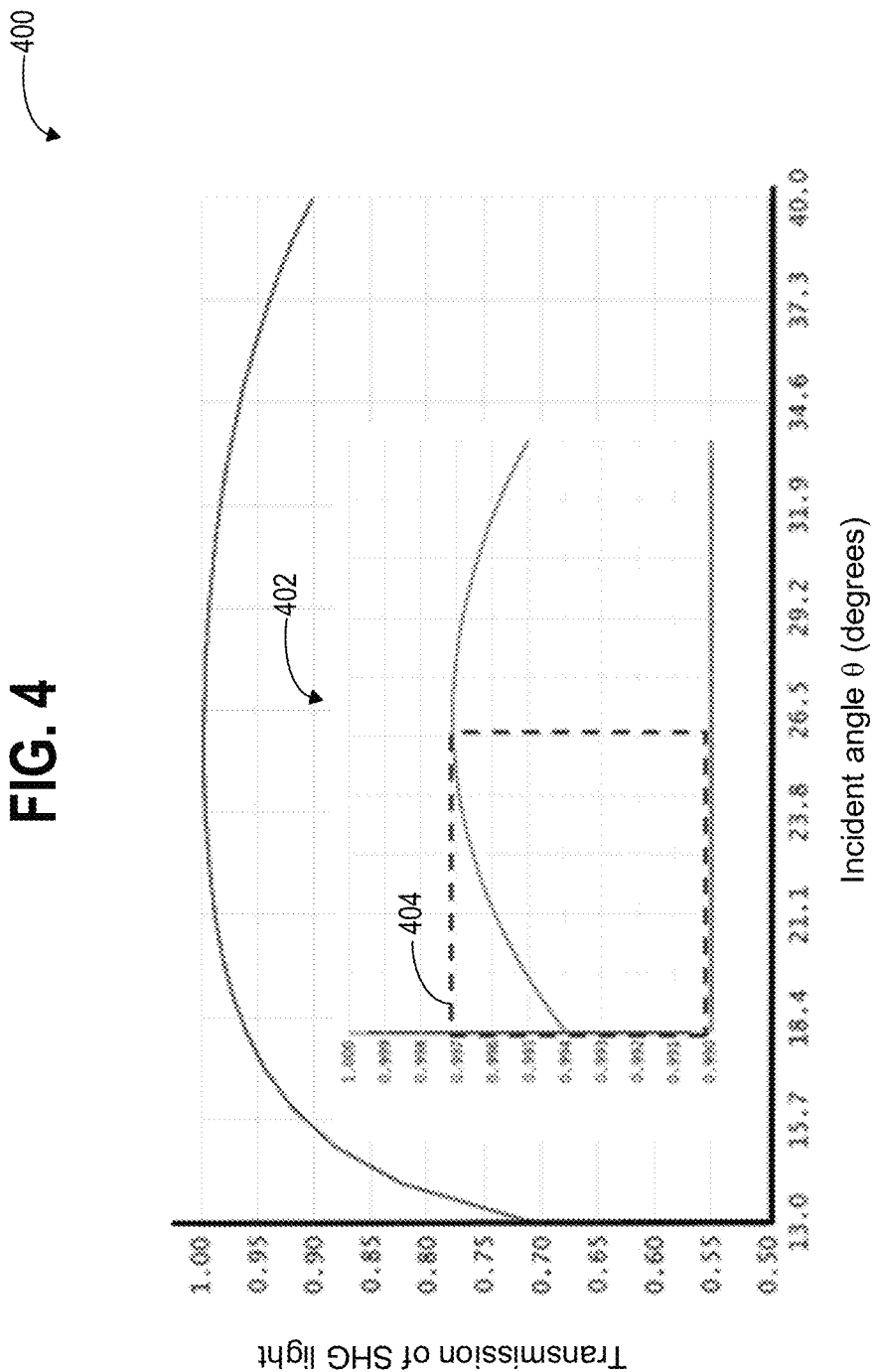
FIG. 4 shows a plot of a percentage of transmission of SHG light vs. incident angle (θ).

Moving to FIG. 4, FIG. 4 shows a plot of a percentage of transmission of SHG light vs. incident angle ($\theta$) 400. The plot 400 shown in FIG. 4 corresponds to transmission of SHG light through a single prism at different incident angles ($\theta$), as calculated by ray tracing software. As shown in FIG. 4, at an incident angle $\theta$ of 30 degrees, transmission of the SHG light at p-polarization is approximately 99.7% in the specific example where the fundamental light is at 440 nm, SHG light at 220 nm, and the prism is made of fused silica. It is noted that plot 402, shown overlaid onto plot 400, includes indicator lines 404 in dash to illustrate that an incident angle $\theta$ of 30 degrees results in transmission of the SHG light of approximately 99.7%.

The plot shown in FIG. 4 is an example where polarization of the source light passed through the prism is in so-called p-polarization. However, it is noted that SHG transmission will be greatly reduced if the polarization is rotated, or if the incident angle ($\theta$) varies significantly from 30 degrees in the above example. That is, the SHG transmission will be greatly reduced if the incident angle ($\theta$) is greater than 31 degrees or less than 29 degrees and/or the polarization of the source light is not perpendicular to a base of the prism performing refraction. The optimal incident angle in conjunction with the choice of prism tip angle for some specific wavelength can be found through Fresnel equations.

As to fundamental light, transmission of the cross-polarized fundamental light (in the s-polarization or the transverse-electric mode) has a transmission of about 74%. The major reduction of the fundamental light does not rely on the transmission loss but on the large difference of the propagation direction and the subsequent spatial filtering, as discussed above.

Figure 5:
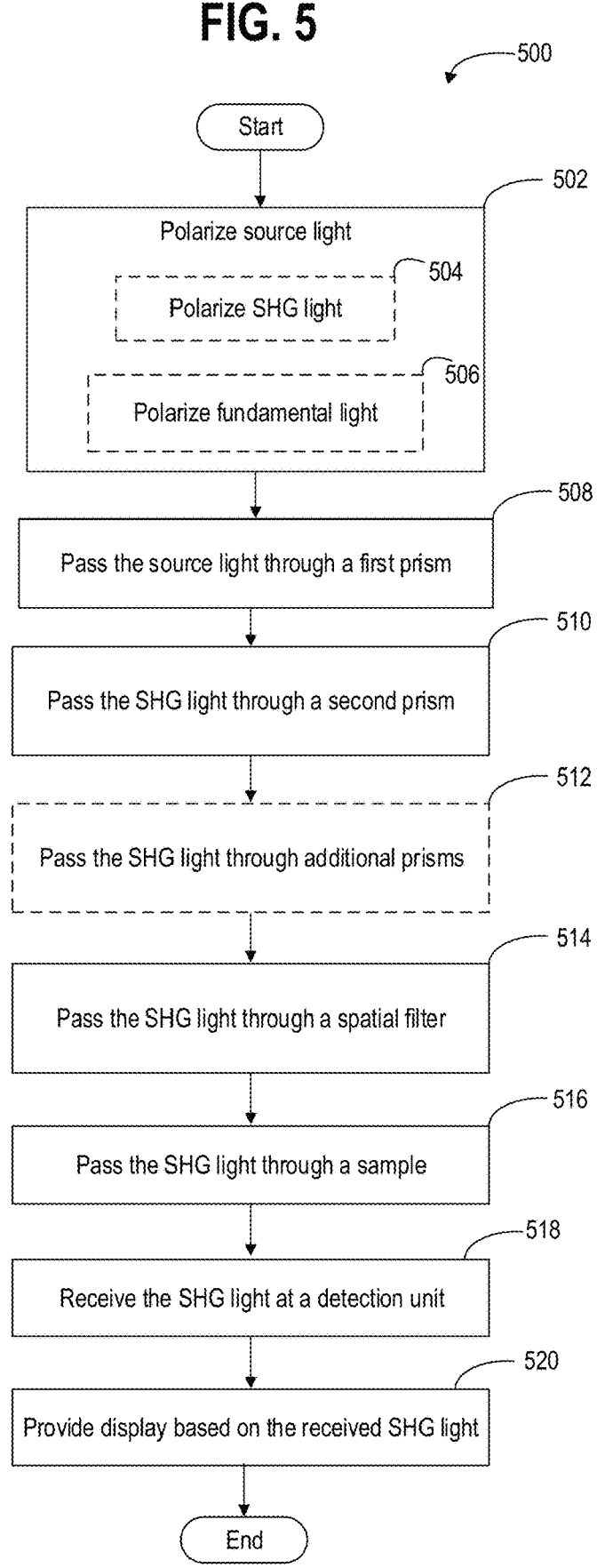
FIG. 5 shows an example method, according to at least one embodiment of the present disclosure.
Figure 6:
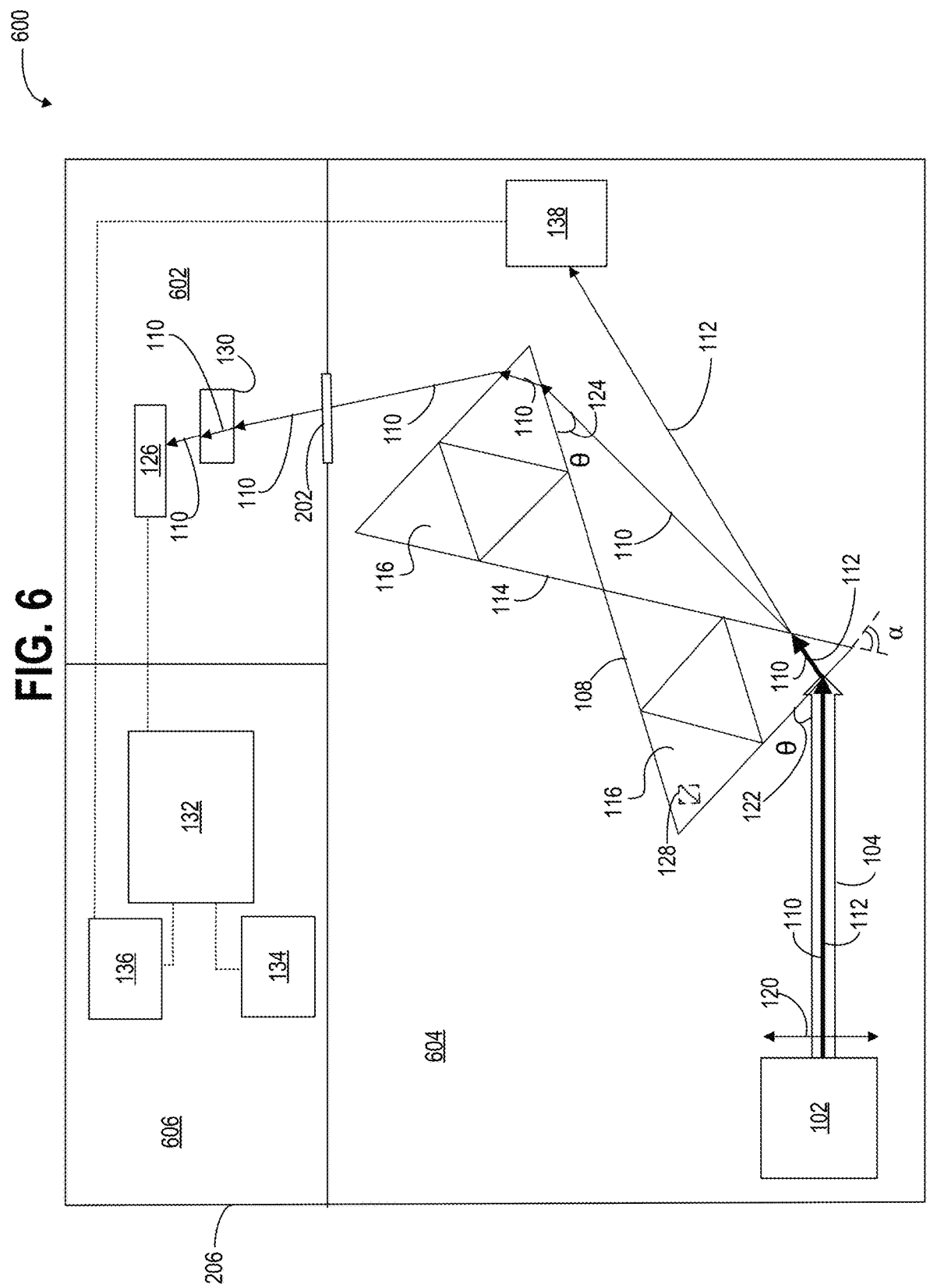
FIG. 6 shows a schematic diagram of a fourth example light separation system, according to at least one example of the present disclosure.

Turning now to FIG. 5, FIG. 5 shows a flow chart of an example method 500. Method 500 may be carried via a light separation system including any one or combination of the features as discussed above. Instructions for carrying out method 500 herein may be executed by a controller, such as control unit 132, based on instructions stored on a memory of the controller and in conjunction with signals received from sensors of the light separation system, such as the sensors described above (e.g., detection unit 126, user input receiving unit 136, and fundamental light receiver 138). The controller may employ actuators of the light separation system to adjust operation of the light separation system. For example, such actuators may include a display unit such as display unit 134 and optics 102, according to the methods described below.

Method 500 may begin responsive to receiving a user input at a user input receiving unit, such as user input receiving device 136. In examples where the light separation system may be a spectroscopy device, for example, the user input received at step 500 may be an input request for a measurement of a sample. Alternatively, the light separation system may be a curing system, and the user input received at step 500 may be a user input received via user input receiving unit 136 requesting operation of the light separating system for curing purposes.

Responsive to receiving the user input, method 500 may polarize source light at step 502. In particular, polarizing source light at step 502 may include polarizing SHG light 504 and polarizing fundamental light 506 may be polarized at step 502. Following step 502, method 500 may include directing the polarized source light through a first prism at step 508. The source light may be a visible source light in one or more examples, such as a 430-nm wavelength laser light.

In one or more examples, the polarized source light may be polarized in a direction perpendicular to a base of the first prism, including polarization of both the SHG light and the fundamental light in a direction perpendicular to a base of the prism through which the source light is being passed through.

By polarizing the SHG light in a direction perpendicular to a base of a prism through which the SHG light is then passed through, a high transmission of the desired SHG light may be ensured. For example, as discussed above, approximately a 99.7% transmission rate through the prism may be achieved by polarizing the SHG light in a direction perpendicular to a base of the prism through which the SHG light is passed.

The polarized source light passed through first prism 508 may be refracted such that an exit angle of the desired SHG light differs from an exit angle of the undesired fundamental light. The separated SHG light may be UVC light emission of approximately 220 nm in wavelength.

However, while the desired SHG light is separated from the fundamental light following step 508, the separation is insufficient to ensure that the extraction of the SHG light is pure, even with a special filter included immediately downstream of the first prism. In fact, the fundamental light may have a much larger intensity and has a Gaussian beam profile. Thus, the inclusion of a spatial filter downstream of the first prism may actually lead to diffraction of fundamental light through the spatial filter.

Thus, following step 508, the SHG light separated via refraction performed by the first prism is further passed through a second prism at step 510. By refracting the SHG light through the second prism following refraction of the SHG light through the first prism, the spatial separation between the SHG light and the undesired fundamental light may be further increased, thus providing sufficient spatial separation of SHG light from the fundamental light for extraction purposes. That is, by passing the source light through the first prism to separate the SHG light and the fundamental light, and then only pass the SHG light through the second prism without passing the fundamental light through the second prism, the technical effect of increased spatial separation between the SHG light and the fundamental light may be achieved, thus enabling improved extraction of the SHG light.

Following step 510, method 500 optionally includes passing the SHG light through additional prisms downstream of the second prism. By routing the SHG light through additional prisms after routing the SHG light through the second prism at step 510, the SHG light may be even further separated from the fundamental light. Moreover, the use of additional prisms may beneficially be used to direct the SHG light to a particular location.

Continuing with method 500, at step 514 the SHG light may be passed through a spatial filter, such as a pinhole, following passing of the SHG light through at least the first and second prism. The inclusion of the spatial filter downstream of at least the first prism and the second prism may help to filter out any fundamental light which may still be proximal the separated SHG light. Further filtering of the fundamental light out of the SHG light via the spatial filter may be beneficial for the purposes of improving a purity of the SHG light extracted.

In cases where the light separation system may be a spectroscopy device, method 500 may include passing the SHG through a sample at step 516 following passing the SHG light through the spatial filter at step 514. For example, the sample may be a liquid or a gas sample. In some examples, the sample may be contained within a cuvette.

Following passing the SHG light through the spatial filter at step 514 and the sample at step 516, method 500 may include receiving the SHG light at a detection unit at step 518. However, in some cases the SHG light may not be passed through a sample between the spatial filter and the detector. For example, in order to perform a reference reading, SHG light may be passed directly from the spatial filter to the detector without being passed through a sample for reference purposes. Then, following the reference reading, a sample may be inserted into the desired SHG light path between the spatial filter and the detector, and a reading of the sample may be taken. Or, in at least one example, a reference reading based on detection of the fundamental light may be utilized. Alternatively no reference readings may be utilized in method 500.

Based on the SHG light received at the detection unit at step 518 and, in some examples, a reference reading, method 500 may include providing a display at step 520. The display may include a visual data such as a graph showing visualized measured emission peaks, in one or more examples. Additionally or alternatively, the display may include quantitative measurement data for the light received at the detector that was passed through the sample, such as in the form of a table. Further, in at least one example, the display may include the raw reference measurement data and/or the display may include results from measurements that take into account both light received at the detector as well as reference measurement data. The display at 520 may beneficially be used to determine information about the sample through which the SHG light has been passed through, such as a chemical composition of the sample, for example.

Alternatively, in examples where the light separation system may not be a spectroscopy or chromatography device, and where the light separation system may instead be a curing device or a disinfectant device, for example, the SHG light may not be passed through a sample and a detection unit following step 514. Rather, in such examples the SHG light may instead be directed towards surfaces to be cured or disinfected following step 514. Moreover, such examples may not include a displaying step such as step 520.

Turning to FIG. 6, FIG. 6 shows a fourth example light separation system 600, where a full view of case 206 is shown. As can be seen in FIG. 6, case 206 includes first compartment 602, second compartment 604, and third compartment 606. In one or more examples, compartment 602 may include an access point for a user to insert and remove sample 130. For example, a door may be included to allow access for placement and removal of sample 130. During readings, environmental light is blocked from entering first compartment 602 and second compartment 604 to prevent environmental light contamination from skewing reading results. Second compartment 604 may be separated from first compartment 602 to avoid degradation of components contained within compartment 604.

It is noted that control unit 132 is shown in a separate third compartment 606 merely for exemplary purposes and that in one or more examples the control unit 132 may be positioned within another compartment such as first compartment 602 or second compartment 604. Or, in some examples, control unit 132 may be completely external to the case. For example, control unit 132 may be wireless connected or have a hardwire connection and be completely separate and external from the case 206. Moreover, the user input receiving units 134 and the display unit 136 within third compartment 606 may be accessible by a user to input requests and to view displays provided via display unit 136. For example, the user input receiving units 134 and the display unit 136 may be positioned on an external surface of the fourth example light separation system 600. In other examples, however, one or both of the user input receiving units 134 and the display unit 136 may be completely separate and external from the case 206.

Thus, provided herein are systems and methods for efficient separation of light, in particular, polarized UV light. In a first example method, the method may comprise passing polarized source light through a first prism, the polarized source light including second-harmonic generation (SHG) light and fundamental light, separating the SHG light from the fundamental light, and passing the separated SHG light through a second prism. Such steps achieve the technical benefit of creating spatial separation between the desired SHG light and fundamental light, thus enabling extraction of the SHG light for curing, disinfecting, spectroscopy, and sterilizing purposes, for example. Additionally, the method may further comprise passing the SHG light through a spatial filter following passing the SHG light through the second prism for further filtering of the SHG light from the undesired fundamental light.

In one or more of the example methods discussed above, the fundamental light is not passed through the second prism, and the fundamental light is not passed through the spatial filter in order to achieve the technical benefit of improved separation between the desired light (SHG light) and the undesired light (fundamental light). That is, the fundamental light may only be passed through the first prism, in at least one example.

Additionally or alternatively, one or more of the methods above may further comprise receiving the SHG light at a detector downstream of both the second prism and the first prism. For example, in cases where the light separation system may be utilized for spectroscopy or chromatography purposes, receiving the SHG light at the detector may enable measurements to be provided for evaluation purposes. In particular, the SHG light may be passed through a sample prior to being received at the detector for spectroscopy or chromatography applications.

In a first example system for separating light, the system may comprise optics providing polarized source light, a first prism positioned downstream of the optics in a path of the polarized source light, a second prism positioned downstream of the first prism, the second prism positioned in a first refracted second-harmonic generation (SHG) light path of the polarized source light, and a spatial filter positioned downstream of the second prism.

In one or more examples, the first example system may further include a second prism coupled to the first prism. Additionally, in one or more examples, the system may comprise a spatial filter positioned in a second refracted SHG light path of the polarized source light.

As discussed above, in one or more embodiments, additional prisms may be included downstream of the second prism. For example, a third prism may be positioned downstream of the second prism. Further prisms may be included in addition to the third prism in one or more examples dependent upon a direction the SHG light needs to be moved, for example.

In examples where there are three prisms, the spatial filter of the system may be positioned in a third refracted SHG light path of the polarized source light, downstream of the third prism. In example systems where there may only be two prisms, a detector may be positioned downstream of the spatial filter and in a second refracted SHG light path, where the second refracted SHG light path is downstream of the first prism and the second prism.

In any one or more of the example systems described above, an incident angle of the source light at the first prism and the second prism may be 30 degrees. However, in some examples, the incident angle may range from 24.5 to 26.5 degrees or be found by using the Fresnel equations.

In another example light separating system, the system may comprise optics providing polarized source light, a first prism positioned downstream of the optics in a path of the polarized source light, a second prism positioned downstream of the first prism, the second prism positioned in a first refracted desired light path of the polarized source light, and a spatial filter positioned downstream of the second prism.

Additionally, in one or more examples the system may further comprise a control unit, the control unit including instructions stored in non-transitory memory for polarizing source light via optics, and directing the polarized source light through the first prism. For example, the system may polarize the source light and direct the polarized source light through the first prism responsive to receiving a user input. The polarized source light may include desired light and undesired light, and wherein the desired light is separated from the undesired light via refraction at the first prism. The desired light may then be further refracted by the second prism which is positioned in the first refracted desired light path. Thus, the technical advantage of creating spatial separation between the desired light and the undesired light may be achieved via refraction at the first prism and the second prism. Furthermore, in one or more examples, the system may further comprising a detector downstream of the spatial filter, wherein the spatial filter and the detector are both positioned in a second refracted desired light path downstream of the second prism. Such features may beneficially enable accurate measurements to be taken for spectroscopy or chromatography purposes, for example.

Note that the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to various devices utilizing light separation, such as spectroscopy, chromatography, curing devices, and disinfecting devices. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   passing polarized source light through a first prism, the polarized source light including second-harmonic generation (SHG) light and fundamental light and separating the SHG light from the fundamental light;
   passing the separated SHG light through a second prism;
   passing the SHG light through a spatial filter following passing the SHG light through the second prism;
   receiving the SHG light at a detector downstream of the first prism, the second prism, and the spatial filter; and
   after passing the SHG light through the second prism, passing the SHG light through a third prism prior to passing the SHG light through the spatial filter and receiving the SHG light at the detector,
   wherein the SHG light is passed directly through each of the first prism, the second prism, and the third prism, and then directly passed from the third prism through the spatial filter.

2. The method as in claim 1, wherein the fundamental light is not passed through the spatial filter.

3. The method as in claim 1, wherein more than 75% of the fundamental light is not passed through the second prism.

4. The method as in claim 1, wherein the SHG light is directed towards a desired destination after being passed through the second prism.

\* \* \* \* \*